(12) United States Patent
Suzuki et al.

(10) Patent No.: US 9,308,924 B2
(45) Date of Patent: Apr. 12, 2016

(54) CALIPER BRAKE APPARATUS

(75) Inventors: Tsutomu Suzuki, Kawasaki (JP);
Yoshiyuki Ookawara, Sagamihara (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/342,755

(22) PCT Filed: Jul. 30, 2012

(86) PCT No.: PCT/JP2012/069296
§ 371 (c)(1),
(2), (4) Date: Mar. 4, 2014

(87) PCT Pub. No.: WO2013/035458
PCT Pub. Date: Mar. 14, 2013

(65) Prior Publication Data
US 2014/0216864 A1     Aug. 7, 2014

(30) Foreign Application Priority Data

Sep. 6, 2011  (JP) .................................. 2011-193791

(51) Int. Cl.
*F16D 55/224*     (2006.01)
*B61H 15/00*      (2006.01)
*F16D 65/18*      (2006.01)
(Continued)

(52) U.S. Cl.
CPC .............. *B61H 15/0007* (2013.01); *B61H 5/00* (2013.01); *F16D 55/227* (2013.01); *F16D 65/0068* (2013.01); *F16D 65/18* (2013.01); *F16D 65/54* (2013.01); *F16D 65/58* (2013.01); *F16D 2121/04* (2013.01); *F16D 2121/08* (2013.01)

(58) Field of Classification Search
CPC ............ F16D 2121/02; F16D 2121/08; F16D 55/2245; F16D 2125/12; F16D 2125/14; F16D 2125/16
See application file for complete search history.

(56) References Cited

U.S. PATENT DOCUMENTS

2010/0025166 A1 *  2/2010  Suzuki ................ F16D 55/2245
                                                     188/73.31

FOREIGN PATENT DOCUMENTS

CN      101568743 A     10/2009
DE      3120685 A1 *    6/1983   ........ F16D 55/22655
(Continued)

OTHER PUBLICATIONS

Office Action dated Apr. 29, 2015, corresponding to Canadian patent application No. 2846019.
(Continued)

*Primary Examiner* — Bradley King
*Assistant Examiner* — Stephen Bowes
(74) *Attorney, Agent, or Firm* — Hauptman Ham, LLP

(57) ABSTRACT

A caliper brake apparatus according to this invention includes: a caliper main body supported on a vehicle body; a brake block that is capable of advancing and retreating relative to the caliper main body and sliding against the disc so as to apply a frictional force to the disc; a pressing mechanism that presses the brake block against the disc using a pressure of a working fluid; and an adjuster that supports the brake block on the caliper main body. The adjuster includes: an anchor pin that is provided to be capable of advancing and retreating relative to the caliper main body and supports the brake block on the caliper main body; a return spring that biases the brake block in a direction heading away from the disc; and a back pressure chamber defined on a back surface of the anchor pin, into which the working fluid is led.

3 Claims, 5 Drawing Sheets

(51) Int. Cl.
*F16D 65/54* (2006.01)
*B61H 5/00* (2006.01)
*F16D 65/00* (2006.01)
*F16D 65/58* (2006.01)
*F16D 55/227* (2006.01)
*F16D 121/04* (2012.01)
*F16D 121/08* (2012.01)

(56) References Cited

FOREIGN PATENT DOCUMENTS

| JP | 62-35123 A | | 2/1987 |
|---|---|---|---|
| JP | 62035122 A | * | 2/1987 |
| JP | 08-226471 A | | 9/1996 |
| JP | 11230212 A | * | 8/1999 |
| JP | 200697783 A | | 4/2006 |
| JP | 2006194315 A | * | 7/2006 |
| JP | 2009-115215 A | | 5/2009 |

OTHER PUBLICATIONS

International Search Report mailed Aug. 21, 2012, in corresponding International Application No. PCT/JP2012/069296.

Office Action issued Jun. 27, 2014, corresponds to Taiwanese patent application No. 101129169.

* cited by examiner

CALIPER BRAKE APPARATUS

RELATED APPLICATIONS

The present application is a National Phase of International Application Number PCT/JP2012/069296, filed Jul. 30, 2012, which claims priority to Japanese Application Number 2011-193791, filed Sep. 6, 2011.

TECHNICAL FIELD

This invention relates to a caliper brake apparatus that applies a brake to rotation of a vehicle wheel by applying frictional force to a disc that rotates together with the vehicle wheel.

BACKGROUND ART

A fluid pressure brake apparatus that performs braking using fluid pressure such as oil pressure or air pressure is conventionally employed in a vehicle such as a railway vehicle.

JP08-226471A discloses a caliper brake apparatus for a railway vehicle including an anchor pin that supports a brake block to be capable of advancing and retreating, a rod that penetrates the anchor pin, and a spring that biases the rod in a return direction of the brake block.

SUMMARY OF INVENTION

With the caliper brake apparatus described in JP08-226471A, however, when fluid pressure in a cylinder rises such that the brake block is pressed against a rotor, resistance is generated by sliding resistance between the anchor pin and the rod and a biasing force of the spring for biasing the rod in an opposite direction. It is therefore difficult to improve a pressing force for pressing the brake block in the caliper brake apparatus.

This invention has been designed in consideration of the problem described above, and an object thereof is to improve a pressing force for pressing a brake block in a caliper brake apparatus.

According to one aspect of this invention, a caliper brake apparatus that sandwiches a disc which rotates together with a vehicle wheel, and applies a frictional force to the disc is provided. The caliper brake apparatus includes: a caliper main body supported on a vehicle body; a brake block that is capable of advancing and retreating relative to the caliper main body and sliding against the disc so as to apply the frictional force to the disc; a pressing mechanism that is configured to press the brake block against the disc using a pressure of a working fluid; and an adjuster that supports the brake block on the caliper main body. The adjuster includes: an anchor pin that is provided to be capable of advancing and retreating relative to the caliper main body and supports the brake block on the caliper main body; a return spring that biases the brake block in a direction heading away from the disc; and a back pressure chamber defined on a back surface of the anchor pin, into which the working fluid is led.

The details as well as other features and advantages of this invention are set forth in the remainder of the specification and are shown in the accompanying drawings.

DESCRIPTION OF EMBODIMENTS

A caliper brake apparatus 100 according to an embodiment of this invention will be described below with reference to the figures.

Figure 1:
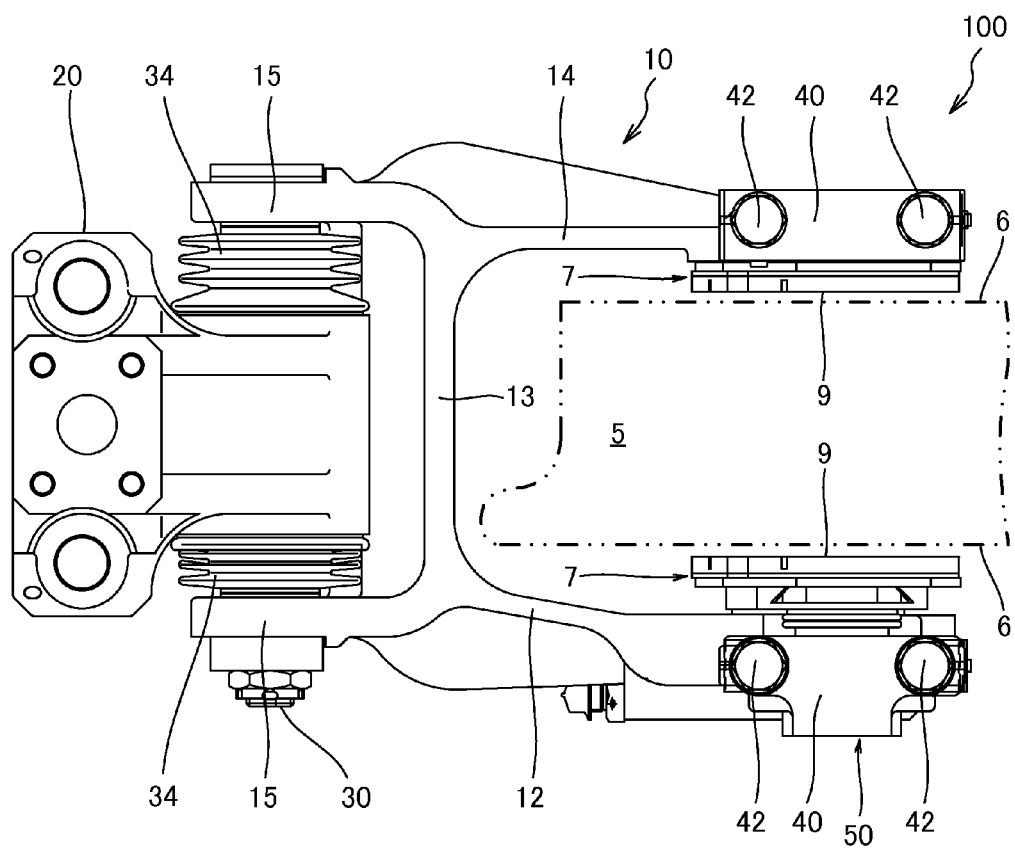
FIG. 1 is a plan view of a caliper brake apparatus according to an embodiment of this invention.
Figure 2:
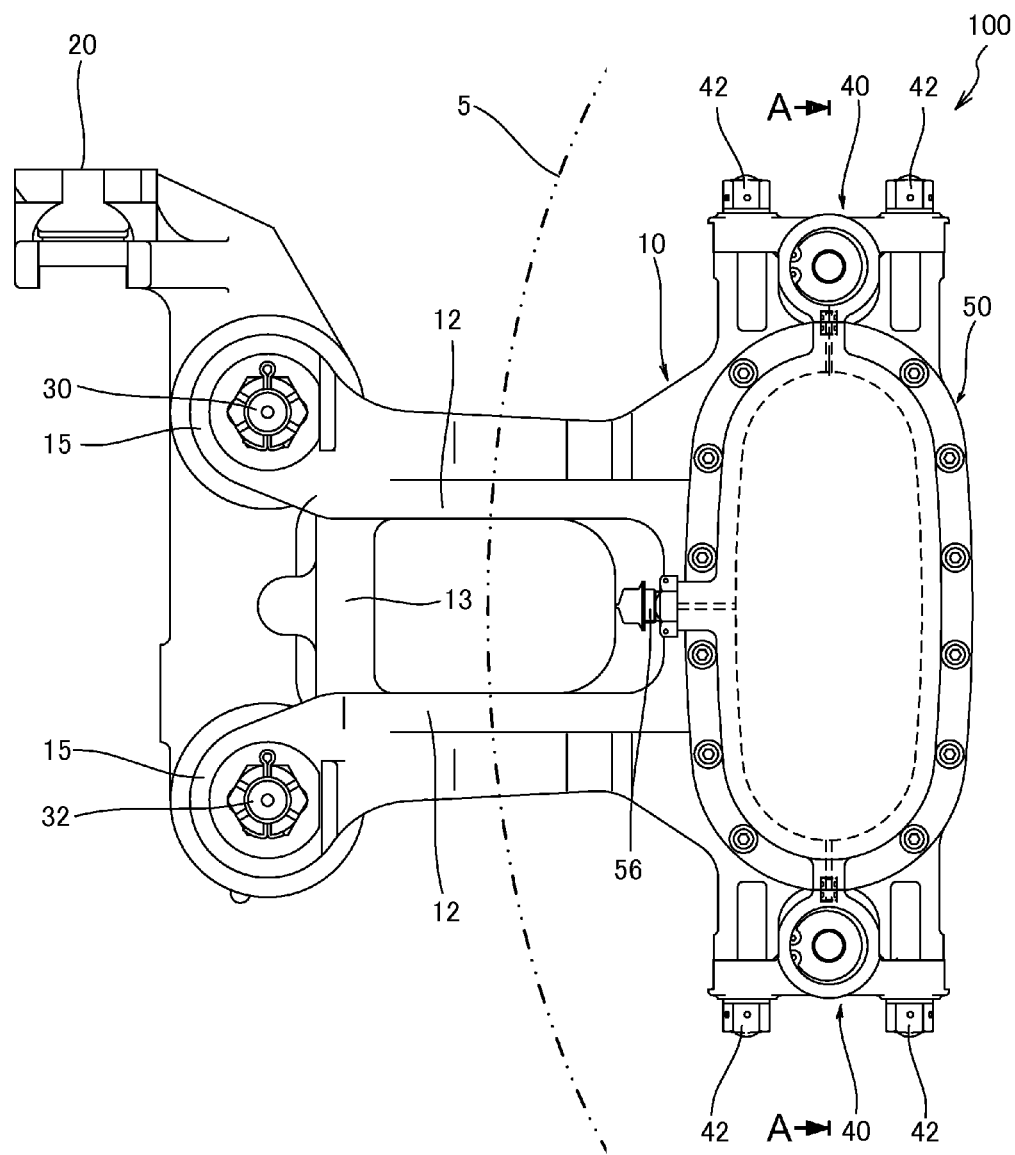
FIG. 2 is a front view of FIG. 1.

First, referring to FIGS. 1 and 2, an overall configuration of the caliper brake apparatus 100 will be described.

The caliper brake apparatus 100 is a pneumatic brake for a railway vehicle, in which compressed air is used as a working fluid. The caliper brake apparatus 100 includes a caliper main body 10 supported on a bogie (a vehicle body), not shown in the figure, via a support frame 20, a pair of brake blocks 7 capable of advancing and retreating relative to the caliper main body 10 and sliding against a disc 6 so as to apply a frictional force thereto, a diaphragm actuator 50 serving as a pressing mechanism that presses the brake blocks 7 against the disc 6 using a pressure (air pressure) of the compressed air, and a pair of adjusters 40 that support the brake blocks 7 on the caliper main body 10.

The caliper brake apparatus 100 applies the frictional force by sandwiching the disc 6, which rotates together with a vehicle wheel 5. More specifically, the caliper brake apparatus 100 is braking the rotation of the vehicle wheel 5 by the resulting frictional force between the disc 6 and the brake blocks 7 by the sandwiching the disc 6 from respective surfaces thereof by the pair of brake blocks 7.

The disc 6 is provided on the vehicle wheel 5 so as to rotate together with the vehicle wheel 5. The disc 6 is formed integrally with the vehicle wheel 5 on both front and rear surfaces thereof. Instead of forming the disc 6 integrally with the vehicle wheel 5 in this manner, a separate disc 6 that rotates together with the vehicle wheel 5 may be provided.

The caliper main body 10 includes a first caliper arm 12 and a second caliper arm 14 that extend so as to straddle the disc 6, a yoke portion 13 that joins the first caliper arm 12 to the second caliper arm 14, and a pair of bracket portions 15 for supporting the caliper main body 10 on the bogie.

The caliper main body 10 is floatingly supported by an upper slide pin 30 and a lower slide pin 32 to be capable of sliding relative to the support frame 20. Thus, the caliper main body 10 follows relative movement of the vehicle wheel 5 in an axial direction relative to the bogie such that the brake blocks 7 oppose the disc 6 of the vehicle wheel 5 in parallel therewith.

The upper slide pin 30 and the lower slide pin 32 are provided to penetrate the support frame 20, and respective end portions thereof are coupled to the bracket portions 15 of the caliper main body 10. The caliper main body 10 is supported on the support frame 20 to be free to slide in an axial direction of the upper slide pin 30 and the lower slide pin 32. Exposed portions of the upper slide pin 30 and the lower slide pin 32 are covered by rubber boots 34 so as to be protected from dust and the like.

The brake blocks 7 receive a pressing force generated by the diaphragm actuator 50 so as to be pressed against the disc 6 in parallel therewith. Each brake block 7 includes a lining 9 that contacts the disc 6 rotating together with the vehicle wheel 5. The brake block 7 applies a brake to the rotation of the vehicle wheel 5 using a frictional force generated by the contact between the lining 9 and the disc 6. Upper and lower ends of the brake block 7 are fixed to an anchor pin 43 of the adjuster 40, to be described below. Further, the brake block 7 is biased in a direction heading away from the disc 6 by a return spring 44 of the adjuster 40, to be described below.

Figure 3:
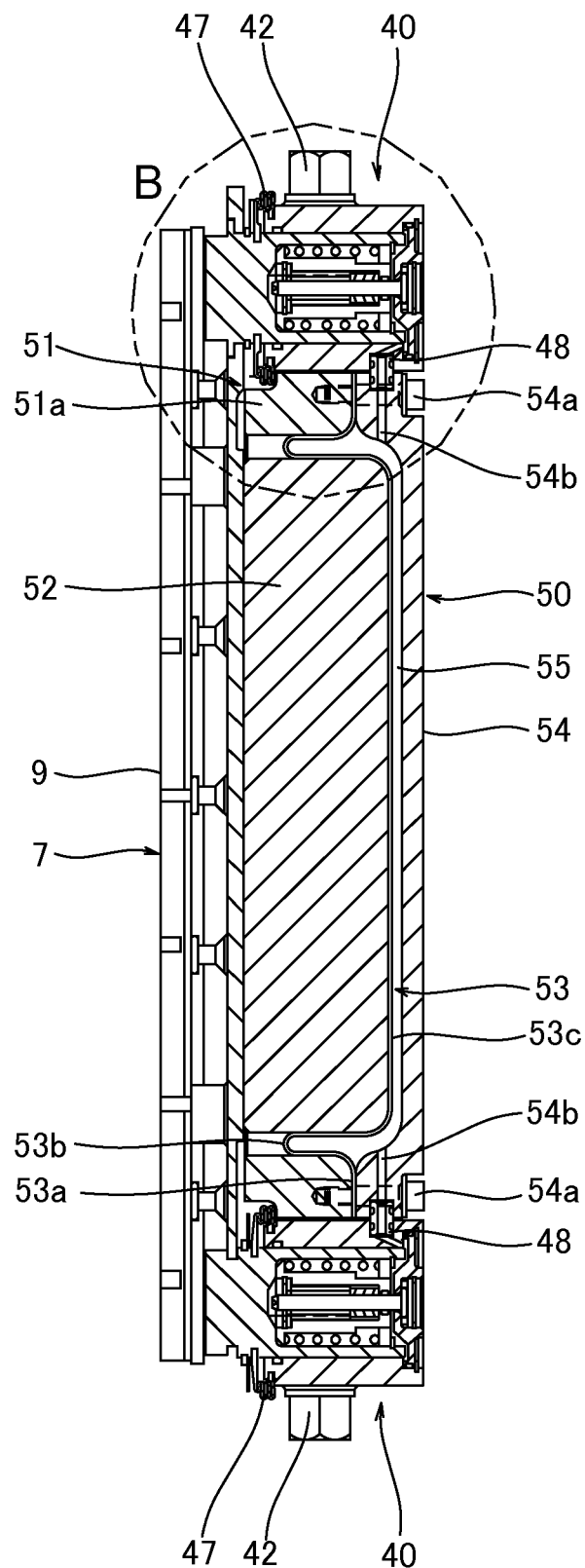
FIG. 3 is an A-A sectional view of FIG. 2.

Next, referring to FIGS. 3 and 4, an internal structure of the caliper main body 10 will be described.

The diaphragm actuator 50 includes a piston 52 that presses the brake blocks 7 against the disc 6, a cylinder 51 through the interior of which the piston 52 slides, and a diaphragm 53 that defines an air chamber 55 within the cylinder 51.

In the diaphragm actuator 50, the diaphragm 53 is deformed by adjusting an air pressure in the air chamber 55, and the brake blocks 7 are pressed against the disc 6 by the deformation of the diaphragm 53. The diaphragm actuator 50 is provided on only the first caliper arm 12 side.

The cylinder 51 includes a cylinder main body 51a on which the piston 52 slides, and a caliper cover 54 that sandwiches the diaphragm 53 together with the cylinder main body 51a so as to fix the diaphragm 53, and closes a back surface of the cylinder 51 so as to define the air chamber 55.

The piston 52 is provided in the cylinder 51 in contact with the brake block 7. The piston 52 is caused to slide through the cylinder 51 by the deformation of the diaphragm 53 contacting the back surface thereof. As the piston 52 slides through the cylinder 51, the brake block 7 advances and retreats relative to the disc 6.

The diaphragm 53 includes a peripheral edge portion 53a, a bellows portion 53b, and a pressing portion 53c. The peripheral edge portion 53a is sandwiched fixedly between the cylinder main body 51a and the caliper cover 54. The bellows portion 53b can be expanded from a folded condition by air pressure supplied to the air chamber 55. The pressing portion 53c contacts the piston 52 and displaces when the folded bellows portions 53b expands. When the pressing portion 53c displaces, the piston 52 is pressed so as to slide through the cylinder 51.

The diaphragm 53 is made of a resin elastic material and formed into a bellows shape using a compound material including a reinforcing material such as carbon fiber or Kevlar fiber, for example. Alternatively, a bellows made of a rubber tube or a thin metal plate may be used.

The caliper cover 54 is fixed to the cylinder main body 51a by a plurality of bolts 54a. The caliper cover 54 sandwiches the peripheral edge portion 53a of the diaphragm 53 fixedly together with the cylinder main body 51a. At this time, the diaphragm 53 made of a resin elastic material serves as packing, thereby securing air-tightness in the air chamber 55.

The air chamber 55 is defined in the interior of the cylinder 51 by the diaphragm 53 and the caliper cover 54. The piston 52 is caused to advance and retreat in response to increases and reductions in a volume of the air chamber 55. A through hole 56 (see FIG. 2) is provided in the air chamber 55. Compressed air for deforming the diaphragm 53 during braking is supplied from an external air pressure source through the through hole 56.

An air passage 54b that leads a part of the compressed air in the air chamber 55 to a back pressure chamber 46 of the adjuster 40, to be described below, is formed in the caliper cover 54.

The air passage 54b opens onto an end surface of the caliper cover 54 facing the adjuster 40 so as to connect the air chamber 55 to the back pressure chamber 46 of the adjuster 40, to be described below. A large diameter portion 54c for attaching a quill 48 is formed in an opening portion of a surface of the air passage 54b that faces the adjuster 40. An inner diameter of the large diameter portion 54c is formed to be large enough to accommodate the quill 48. The quill 48 is a hollow shaft provided between the cylinder 51 and a brake block bearing 41 in order to connect the air chamber 55 to the back pressure chamber 46. The quill 48 will be described in detail below.

The adjuster 40 adjusts an initial position of the brake block 7 relative to the disc 6. The adjuster 40 is disposed both above and below the diaphragm actuator 50. The adjusters 40 are fastened respectively to upper and lower end portions of the caliper main body 10 by anchor bolts 42.

Figure 4:
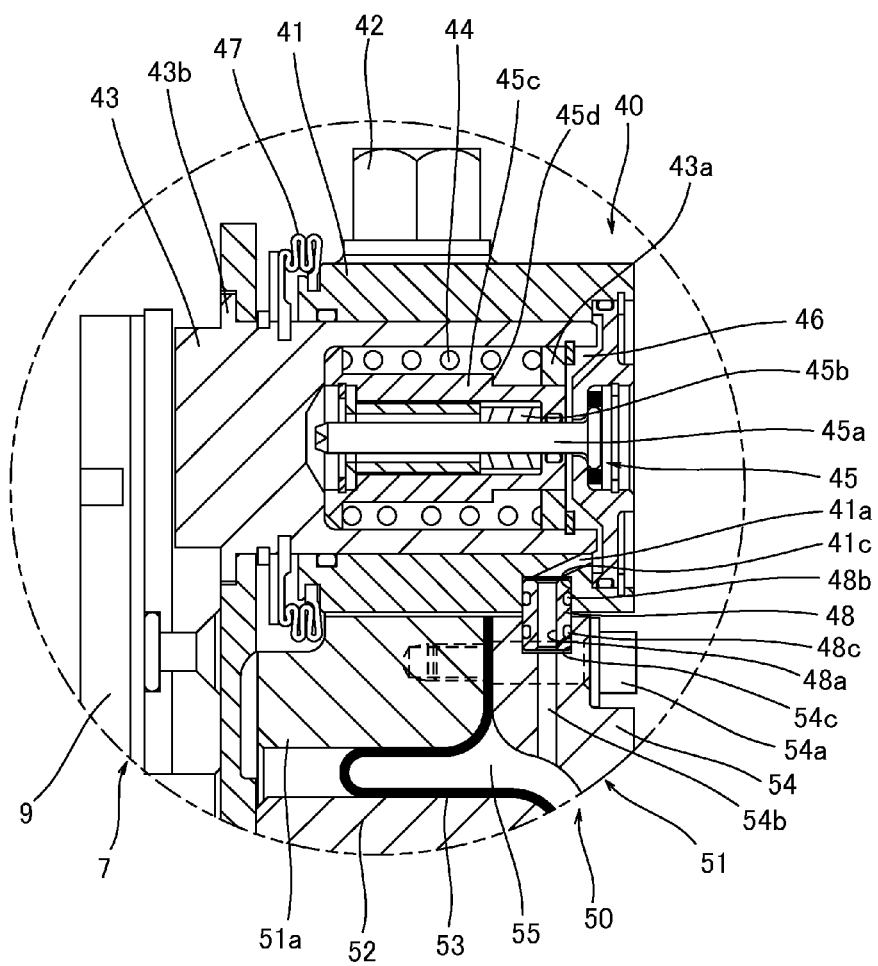
FIG. 4 is an enlarged view of a B portion of FIG. 3.

As shown in FIG. 4, each adjuster 40 includes the brake block bearing 41, which is fixed to the caliper main body 10 by the anchor bolt 42, the anchor pin 43, which is provided to be capable of advancing and retreating relative to the brake block bearing 41 and supports the brake block 7 on the caliper main body 10, the return spring 44, which biases the brake block 7 in the direction heading away from the disc 6, a gap adjustment mechanism 45 that adjusts a gap between the brake block 7 and the disc 6 to a fixed value when the brake is released, and the back pressure chamber 46, which is defined on a back surface of the anchor pin 43.

The anchor pin 43 is formed in a substantially closed-end cylindrical shape. The anchor pin 43 includes a collar portion 43b that engages with the brake block 7. The anchor pin 43 is provided such that a bottom portion thereof projects from the brake block bearing 41. The anchor pin 43 supports the brake block 7 by fitting the collar portion 43b into respective end portions of the brake block 7.

When the diaphragm 53 deforms during braking so as to press the brake block 7 against the disc 6, the anchor pin 43 follows the movement of the diaphragm 53 so as to displace in an axial direction. During braking, the brake block 7 slides against the disc 6, and the resulting frictional force causes the disc 6 to attempt to move the brake block 7 in a circumferential direction. The anchor pin 43 holds the brake block 7 against this frictional force.

The return spring 44 and the gap adjustment mechanism 45 are accommodated in an inner periphery of the anchor pin 43. A flat washer 43a is provided on the inner periphery of the anchor pin 43 in the vicinity of an open end portion. A sliding portion of the anchor pin 43 that is exposed to the outside during sliding is covered by a rubber boot 47 so as to be protected from dust and the like.

The return spring 44 is a coil spring interposed in a compressed condition in the inner periphery of the anchor pin 43. The return spring 44 biases the flat washer 43a of the anchor pin 43 in the axial direction against a collar 45c of the gap adjustment mechanism 45. When a braking condition shifts to a non-braking condition, the collar portion 43b of the anchor pin 43 pushes back the brake block 7 using a biasing force of the return spring 44 so that the brake block 7 is separated from the disc 6 by a predetermined distance. Thus, a distance between the brake block 7 and the disc 6 during non-braking can be adjusted such that a favorable heat radiation property is realized in the disc 6.

The brake block bearing 41 supports the anchor pin 43 to be capable of advancing and retreating. The brake block bearing 41 closes the back surface of the anchor pin 43 so as to define the back pressure chamber 46. The brake block bearing 41 includes an air passage 41a that connects the air chamber 55 to the back pressure chamber 46 via the quill 48.

The back pressure chamber 46 is defined between an interior of the brake block bearing 41 and the back surface of the anchor pin 43. A part of the compressed air in the diaphragm actuator 50 is led to the back pressure chamber 46. When the compressed air is led into the back pressure chamber 46 from the air chamber 55 during braking, an internal pressure of the back pressure chamber 46 rises. As a result, the anchor pin 43 is pushed in a direction for causing the brake block 7 to approach the disc 6.

The air passage 41a opens onto an end surface of the brake block bearing 41 facing the caliper main body 10 so as to connect the back pressure chamber 46 to the air chamber 55 in the caliper main body 10. A large diameter portion 41c for attaching the quill 48 is formed in an opening portion of a surface of the air passage 41a that faces the caliper main body 10.

The large diameter portion 41c of the air passage 41a is formed to open coaxially with the large diameter portion 54c of the air passage 54b. The large diameter portion 41c is formed to have a substantially identical inner diameter to the large diameter portion 54c. The large diameter portion 41c and the large diameter portion 54c are formed such that a total axial direction length thereof is greater than an axial direction length of the quill 48.

The quill 48 is a hollow shaft having a through hole 48a through which compressed air can pass in an inner periphery thereof. The quill 48 connects the air passage 41a of the adjuster 40 to the air passage 54b of the caliper main body 10.

An outer periphery of the quill 48 is sealed by an O ring 48b provided between the quill 48 and the large diameter portion 41c of the brake block bearing 41 and an O ring 48c provided between the quill 48 and the large diameter portion 54c of the caliper cover 54. The O ring 48b and the O ring 48c possess elasticity, and therefore, even when the large diameter portion 41c and the large diameter portion 54c are not perfectly coaxial, a deviation between respective central axes thereof can be absorbed by the elasticity of the O ring 48b and the O ring 48c. It should be noted that any sealing member capable of sealing the outer periphery of the quill 48 may be used instead of the O ring 48b and O ring 48c.

When assembling the adjuster 40 and the caliper main body 10, the quill 48 is fitted into the large diameter portion 54c, the adjuster 40 is attached such that the large diameter portion 54c fits into the quill 48, and then the anchor bolts 42 are tightened. In so doing, the air chamber 55 in the caliper main body 10 and the back pressure chamber 46 in the adjuster 40 can be connected at the same time as the adjuster 40 and the caliper main body 10 are assembled. Hence, by providing the quill 48, the air passage 54b and the air passage 41a can be connected easily.

The gap adjustment mechanism 45 adjusts an amount by which the brake block 7 is returned by the biasing force of the return spring 44 when the brake is released to a fixed amount. In other words, the gap adjustment mechanism 45 maintains an interval between the brake block 7 and the disc 6 at a fixed value at all times during non-braking. The gap adjustment mechanism 45 includes a fixing pin 45a fixed to the brake block bearing 41, a grip 45b fixed to the fixing pin 45a to be capable of moving in the axial direction, and the collar 45c, which is capable of moving in the axial direction relative to the fixing pin 45a in accordance with the movement of the grip 45b.

The grip 45b can be moved in the axial direction by causing the anchor pin 43 to advance using a pressing force generated by the compressed air in the back pressure chamber 46 such that the flat washer 43a contacts and presses a step portion 45d of the collar 45c. The grip 45b grips an outer periphery of the fixing pin 45a by a force having a magnitude at which, depending on the biasing force of the return spring 44, axial direction movement is impossible. Therefore, the grip 45b, which moves in an advancement direction of the anchor pin 43 during braking, maintains its position without being returned by the biasing force of the return spring 44 when the brake is released.

While wear on the brake block 7 remains small, a stroke amount of the anchor pin 43 during braking is also small. Therefore, the flat washer 43a does not contact the step portion 45d of the collar 45c even when the anchor pin 43 advances. Hence, when the brake is released, the anchor pin 43 returns to its original pre-braking position.

When wear on the brake block 7 advances such that the stroke amount of the anchor pin 43 during braking increases, on the other hand, the advancement of the anchor pin 43 causes the flat washer 43a to contact and press the step portion 45d. The flat washer 43a is moved together with the collar 45c while dragging the grip 45b. When the brake is released, therefore, the anchor pin 43 returns only to a position corresponding to an identical advancement amount to the movement amount of the collar 45c. Hence, the position of the brake block 7 during non-braking can be moved forward by an amount corresponding to a thickness of the wear, and as a result, the interval between the brake block 7 and the disc 6 during non-braking can be kept constant at all times.

An operation of the caliper brake apparatus 100 according to this embodiment of this invention will now be described.

When the railway vehicle travels, the vehicle wheel 5 rotates at high speed. Here, when the caliper brake apparatus 100 is switched to a braking condition by an operation of a driver or the like, compressed air supplied from an air pressure source is delivered into the air chamber 55 through the through hole 56 so as to deform the diaphragm 56. Accordingly, the bellows portion 53b of the diaphragm 53 expands such that the pressing portion 53c causes the piston 52 to slide in the direction of the disc 6.

The pressing portion 53c of the diaphragm 53 displaces in the direction of the vehicle wheel 5 such that the brake block 7 is pressed against the disc 6 provided on the vehicle wheel 5 via the piston 52. When the brake block 7 pressed by the diaphragm 53 contacts the disc 6 such that frictional force is generated, a brake is applied to the rotation of the vehicle wheel 5. As a result, the railway vehicle decelerates and eventually stops.

In a conventional caliper brake apparatus, the anchor pin 43 advances and retreats in accordance with the advancement and retreat of the brake block 7. When the piston 52 presses the brake block 7 during braking, therefore, resistance is generated by the sliding resistance of the anchor pin 43 and the biasing force of the return spring 44.

In the caliper brake apparatus 100, on the other hand, a part of the compressed air in the air chamber 55 is led into the back pressure chamber 46 defined on the back surface of the anchor pin 43 through the air passage 54b, the through hole 48a, and the air passage 41a. During braking, the anchor pin 43 is pressed in the direction for causing the brake block 7 to approach the disc 6 by the compressed air led into the back pressure chamber 46. Hence, the resistance generated when the brake block 7 is pressed can be canceled out, and as a result, the pressing force applied to the brake block in the caliper brake apparatus 100 can be improved.

Further, in a conventional caliper brake apparatus, resistance is generated by the sliding resistance of the anchor pin 43 and the biasing force of the return spring 44, and therefore a pressing force generated in the vicinity of the anchor pin 43 is smaller than a pressing force of a part pressed by the piston 52. As a result, respective end portions of the lining 9 are not pressed forcefully, making it difficult to keep a contact condition between the lining 9 and the disc 6 constant.

During braking in the caliper brake apparatus 100, on the other hand, the anchor pin 43 is pressed in the direction for causing the brake block 7 to approach the disc 6 by the compressed air led to the back pressure chamber 46. Therefore, the pressing force in the vicinity of the anchor pin 43 can be made equally large to the pressing force of the part pressed by the piston 52. As a result, a contact area of the lining 9 during braking can be increased, and the contact condition between the lining 9 and the disc 6 can be kept constant.

When the brake applied to the vehicle wheel 5 is released by an operation of the driver or the like, the brake block 7 is separated from a condition of contact with the disc 6 by a restoring force of the return spring 44 provided in the interior of the adjuster 40. Further, the compressed air in the air chamber 55 is discharged through the through hole 56 such that the bellows portion 53b of the diaphragm 53 returns to its pre-braking folded condition and the pressing portion 53c returns to its pre-braking position. Accordingly, the piston 52 likewise returns to its pre-braking position, whereby the disc 6 and the brake block 7 are again caused to oppose each other across a fixed interval by the gap adjustment mechanism 45. As a result, the vehicle wheel 5 can rotate without being affected by the caliper brake apparatus 100.

With the embodiment described above, following effects are obtained.

A part of the compressed air by which the diaphragm actuator 50 pushes the brake block 7 against the disc 6 is led into the back pressure chamber 46 defined on the back surface of the anchor pin 43. During braking, the anchor pin 43 is pressed in the direction for causing the brake block 7 to approach the disc 6 by the compressed air led into the back pressure chamber 46. Hence, the sliding resistance generated in the anchor pin 43 when the brake block 7 is pushed and the biasing force of the return spring 44 can be canceled out, enabling an improvement in the pressing force applied to the brake block in the caliper brake apparatus 100.

Figure 5:
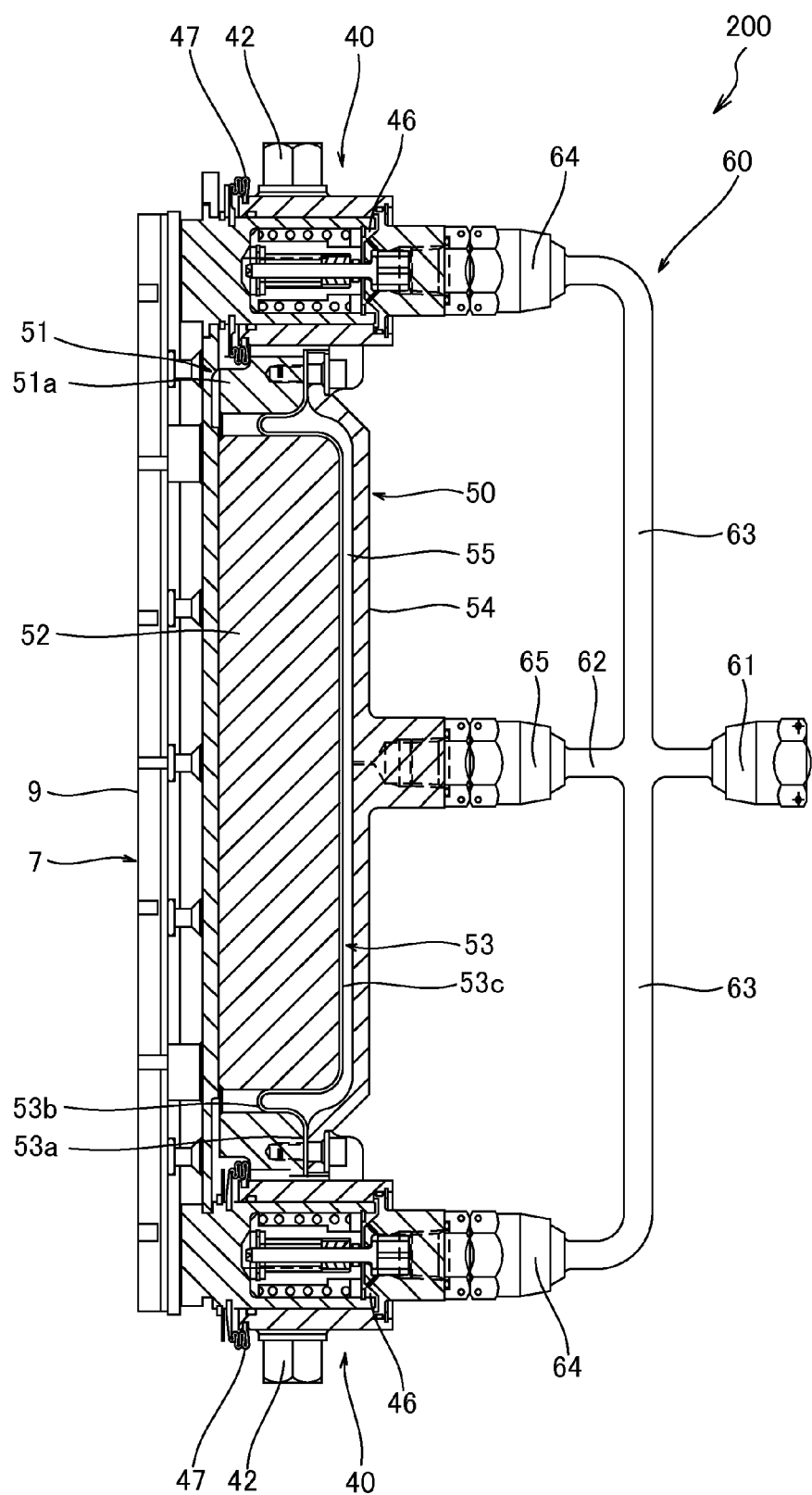
FIG. 5 is a sectional view of a caliper brake apparatus according to a modified example of this embodiment of this invention.

Next, referring to FIG. 5, a caliper brake 200 according to a modified example of this embodiment of this invention will be described.

The caliper brake 200 includes an air pressure supply mechanism 60 that supplies compressed air serving as a working fluid to the air chamber 55 of the diaphragm actuator 50 and the back pressure chamber 46 of the adjuster 40.

The air pressure supply mechanism 60 includes a plug 61 connected to an external air pressure source, a supply flow passage 62 that leads the supplied compressed air into the air chamber 55, a plug 65 that connects the supply flow passage 62 to the air chamber 55, a pair of supply flow passages 63 that lead the supplied compressed air to the respective back pressure chambers 46, and a pair of plugs 64 that connect the supply flow passages 63 to the respective back pressure chambers 46.

During braking by the caliper brake 200, compressed air supplied via the plug 61 is led into the air chamber 55 through the supply flow passage 62. As a result, the diaphragm 53 deforms, causing the piston 52 to slide in the direction of the disc 6. At this time, a part of the compressed air supplied through the plug 61 is led into the respective back pressure chambers 46 through the supply flow passages 63.

Accordingly, the anchor pin 43 is pressed in the direction for causing the brake block 7 to approach the disc 6. Hence, the sliding resistance generated in the anchor pin 43 when the brake block 7 is pushed and the biasing force of the return spring 44 can be canceled out, enabling an improvement in the pressing force applied to the brake block in the caliper brake apparatus 100.

It should be noted that instead of leading the compressed air supplied via the plug 61 to the air chamber 55 and the back pressure chamber 46, separate air pressure sources may be provided for the compressed air led into the air chamber 55 and the compressed air led into the back pressure chamber 46. In this case, the force by which the piston 52 presses the brake block 7 and the force by which the anchor pin 43 presses the brake block 7 can be adjusted individually.

Although the invention has been described above with reference to certain embodiments, the invention is not limited to the embodiments described above. Modifications and variations of the embodiments described above will occur to those skilled in the art, within the scope of the claims.

For example, in the caliper brake apparatus 100, compressed air is used as a working fluid, but this invention is not limited thereto, and may be applied to a hydraulic brake that employs oil as a working fluid instead.

This application claims priority based on Japanese Patent Application No. 2011-193791 filed with the Japan Patent Office on Sep. 6, 2011, the entire contents of which are incorporated into this specification.

The embodiments of this invention in which an exclusive property or privilege is claimed are defined as follows:

The invention claimed is:

1. A caliper brake apparatus configured to sandwich a disc rotatable together with a vehicle wheel, and to apply a frictional force to the disc, the caliper brake apparatus comprising:
a caliper main body supported on a vehicle body;
a brake block that is configured to advance and retreat relative to the caliper main body and to slide against the disc so as to apply the frictional force to the disc;
a pressing mechanism that is configured to press the brake block against the disc using a pressure of a working fluid; and
an adjuster that supports the brake block on the caliper main body,
wherein the adjuster includes:
an anchor pin that is configured to advance and retreat relative to the caliper main body and supports the brake block on the caliper main body;
a brake block bearing that supports the anchor pin to enable the anchor pin to advance and retreat;
a return spring that biases the brake block in a direction heading away from the disc; and
a back pressure chamber which is defined on a back surface of the anchor pin, and into which the working fluid is led,
wherein the pressing mechanism includes:
a piston that is configured to press the brake block against the disc;
a cylinder having an interior in which the piston is slidable; and
a diaphragm that defines a fluid chamber in the cylinder and is deformable by variation in the pressure of the working fluid in the fluid chamber so as to apply a pressing force on the brake block to press the brake block against the disc, and
wherein the caliper brake apparatus further comprises:
a quill provided between the cylinder and the brake block bearing to connect the fluid chamber to the back pressure chamber.

2. The caliper brake apparatus as defined in claim 1, wherein
a part of the working fluid in the pressing mechanism is led into the back pressure chamber.

3. The caliper brake apparatus as defined in claim 1, wherein
the cylinder includes:
a cylinder main body along which the piston is slidable; and
a caliper cover,
the caliper cover, together with the cylinder main body, sandwiches the diaphragm so as to fix the diaphragm,
the caliper cover closes a back surface of the cylinder so as to define the fluid chamber,
a caliper cover fluid passage, through which the pressure of the working fluid is led into the back pressure chamber, is formed in the caliper cover, and
the brake block bearing includes a brake block bearing fluid passage that connects the back pressure chamber to the fluid chamber via the quill.

* * * * *